United States Patent
Wright et al.

(10) Patent No.: US 8,775,529 B2
(45) Date of Patent: Jul. 8, 2014

(54) BRIDGING COMMUNICATIONS BETWEEN COMMUNICATION SERVICES USING DIFFERENT PROTOCOLS

(75) Inventors: Kenneth W. Wright, Warrenton, VA (US); John S. Lear, Purcellville, VA (US); John E. Stem, Berryville, VA (US)

(73) Assignee: Raytheon Company, Waltham, MA (US)

( * ) Notice: Subject to any disclaimer, the term of this patent is extended or adjusted under 35 U.S.C. 154(b) by 1102 days.

(21) Appl. No.: 12/437,915

(22) Filed: May 8, 2009

(65) Prior Publication Data

US 2010/0287226 A1 Nov. 11, 2010

(51) Int. Cl.
*G06F 15/16* (2006.01)
*H04L 12/58* (2006.01)
*H04L 29/08* (2006.01)
*H04L 29/06* (2006.01)

(52) U.S. Cl.
CPC ............ *H04L 67/306* (2013.01); *H04L 12/589* (2013.01); *H04L 51/36* (2013.01); *H04L 69/08* (2013.01)
USPC ............ 709/206; 709/204; 709/205; 709/207

(58) Field of Classification Search
CPC ..... H04L 12/589; H04L 67/306; H04L 51/36; H04L 69/08
USPC .................................. 709/204, 205, 206, 207
See application file for complete search history.

(56) References Cited

U.S. PATENT DOCUMENTS

| | | | |
|---|---|---|---|
| 7,490,346 B2* | 2/2009 | Alao et al. | 725/151 |
| 8,635,273 B2* | 1/2014 | Appelman et al. | 709/204 |
| 2002/0087704 A1* | 7/2002 | Chesnais et al. | 709/228 |
| 2003/0125927 A1* | 7/2003 | Seme | 704/3 |
| 2005/0240672 A1* | 10/2005 | Chen et al. | 709/229 |
| 2006/0117264 A1* | 6/2006 | Beaton et al. | 715/751 |
| 2006/0252435 A1* | 11/2006 | Henderson et al. | 455/466 |
| 2007/0043878 A1* | 2/2007 | Carlson et al. | 709/246 |
| 2007/0189520 A1* | 8/2007 | Altberg et al. | 380/30 |
| 2007/0254669 A1* | 11/2007 | Katz et al. | 455/445 |
| 2007/0266097 A1* | 11/2007 | Harik et al. | 709/204 |
| 2008/0025328 A1* | 1/2008 | Alberts | 370/401 |
| 2008/0120380 A1* | 5/2008 | Boyd et al. | 709/206 |
| 2009/0044252 A1* | 2/2009 | Kashima et al. | 726/3 |
| 2009/0070433 A1* | 3/2009 | Karstens | 709/206 |
| 2009/0112782 A1* | 4/2009 | Cross et al. | 706/45 |
| 2009/0125499 A1* | 5/2009 | Cross et al. | 707/5 |
| 2009/0254840 A1* | 10/2009 | Churchill et al. | 715/753 |
| 2010/0042690 A1* | 2/2010 | Wall | 709/206 |

* cited by examiner

*Primary Examiner* — Hieu Hoang
(74) *Attorney, Agent, or Firm* — Cantor Colburn LLP

(57) ABSTRACT

According to particular embodiments, a system for bridging communications includes agent servers that deploy monitoring agents into source communication services where the monitoring agents collect events in a native communication protocol of the source communication service. The agent servers select events for relaying and translate those events into a native communication protocol of the destination communication service. In addition, the agent servers deploy relay agents into destination communication services to relay the translated events to the destination communication service.

17 Claims, 5 Drawing Sheets

BRIDGING COMMUNICATIONS BETWEEN COMMUNICATION SERVICES USING DIFFERENT PROTOCOLS

TECHNICAL FIELD

This disclosure relates generally to communication systems and, more particularly, to communication systems and methods for bridging communications between communication services.

BACKGROUND

People often use the Internet as a means for social interaction (through email, instant messaging, chat rooms, electronic message boards, etc.). They may subscribe to chat services that are provided by chat service providers. In addition, services such as match.com, trading marketplaces such as ebay, and online recruiting sites such as monster.com may incorporate chat services into their business models. Chat services utilize various communication protocols and software applications to facilitate the exchange of communications.

SUMMARY

According to particular embodiments, a system for bridging communications includes a database that stores user profiles and one or more agent servers that deploy monitoring agents. The monitoring agents receive monitoring instructions and a user profile, register the selected user profile for monitoring with a source communication service, collect events from the source communication service in a native communication protocol of the source communication service, and transmit the events to the agent server. In addition, the agent servers receive the events and, for each of multiple sets of bridging instructions, determine a destination communication service according to the bridging instructions, identify events from the collected events to relay to the destination communication service, and translate the identified events to a native communication protocol of the destination communication service. Further, the agent servers deploy multiple relay agents, each of which receives one of the user profiles for relaying and the translated events, registers the selected user profile for relaying with the destination communication service, and submits the translated events to the destination communication service.

Certain embodiments may provide one or more technical advantages. A technical advantage of one embodiment may be the ability to provide a bridge infrastructure for interconnecting multiple group communication services. This capability is important to organizations that use group communication services to communicate in real time across network domains using heterogeneous software infrastructures.

Another technical advantage may be the ability to allow users participating in independent chatrooms hosted on dissimilar protocols to communicate without changing their respective protocols or client software. In addition, the bridge infrastructure is entirely server based and is thus capable of transparently integrating existing chat servers and sessions.

Other technical advantages of the present disclosure may be readily apparent to one skilled in the art from the following figures, descriptions, and claims. While specific advantages have been enumerated above, various embodiments may include all, some, or none of the enumerated advantages.

BRIEF DESCRIPTION OF THE DRAWINGS

For a more complete understanding of embodiments of the present disclosure and its advantages, reference is made to the following description, taken in conjunction with the accompanying drawings, in which.

DETAILED DESCRIPTION OF EXAMPLE EMBODIMENTS

In accordance with the teachings of the present disclosure, a method and system are provided that support bridging communications between multiple communication services using multiple protocols. In general, the method and system for bridging communication services deploys monitoring agents into source communication services where the monitoring agents collect events in a native communication protocol of the source communication service, select events for relaying, translate that events into a native communication protocol of the destination communication service, and deploy relay agents into destination communication services to relay the translated events to the destination communication service. According to particular embodiments, multiple communication services hosted in differing protocols may be interconnected without modifying any user software.

Figure 1:
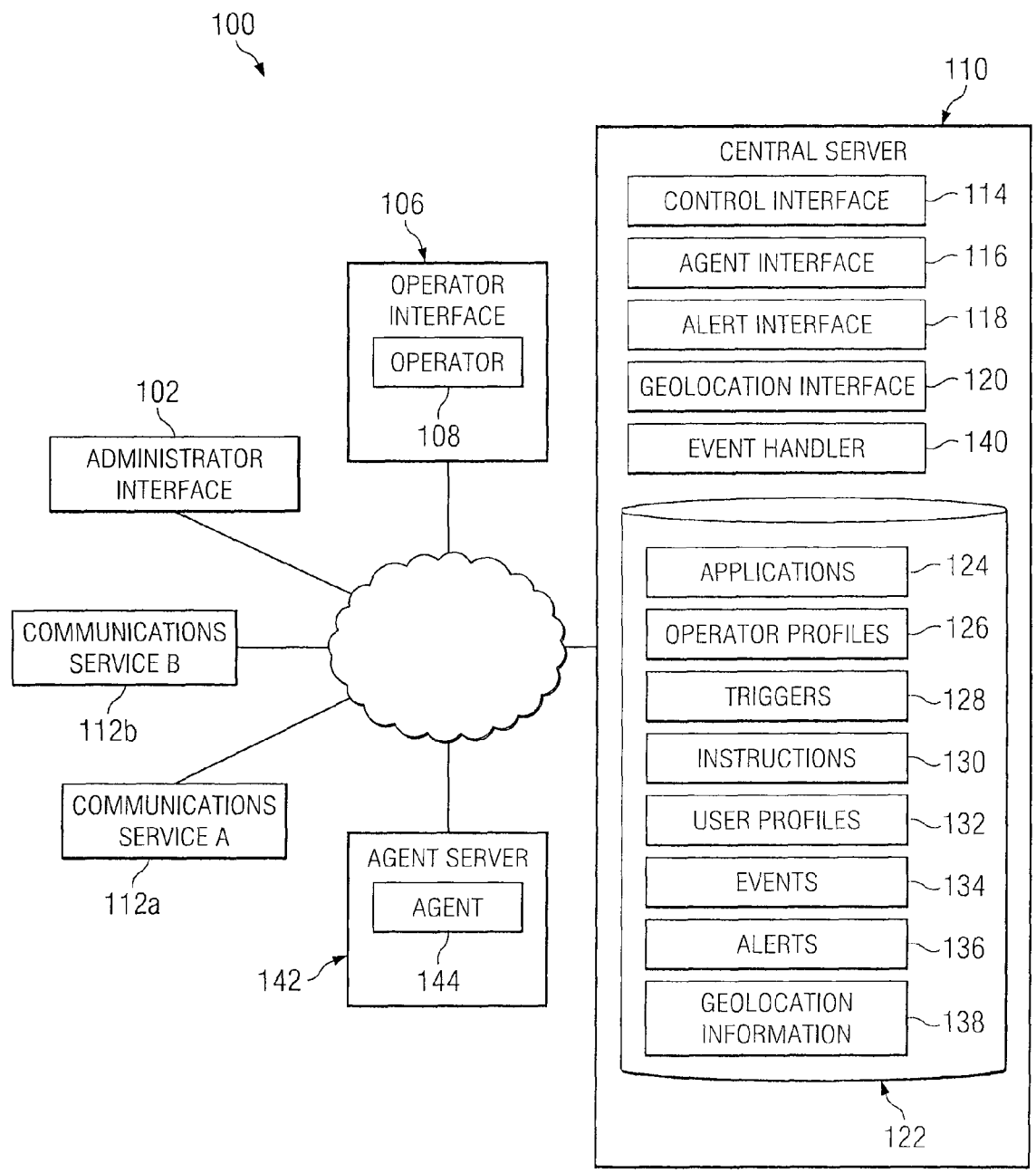
FIG. 1 illustrates example portions of a system for bridging communications in accordance with various embodiments of the present disclosure.

FIG. 1 illustrates a portion of a system 100 for bridging communications. As illustrated, system 100 includes communication services 112, operator interface 106, operator 108, administrator interface 102, central server 110, agent server 142, and agent 144. In operation, system 100 bridges communications between multiple communication services 112 by translating data collected by monitoring agents 144 from a source communication service 112 and by relaying the translated data to a destination communication service 112 using relay agents 144.

Communication services 112 include chat rooms, online messaging services, and any other service for communication between users registered to communicate with other users through that service using a particular communication protocol. The present disclosure is not limited to particular communication services such as chat room services or instant messaging services. A user represents a person whose communications using a communication service 112 are subject to being monitored and/or recorded. A user may be considered active if the user is transmitting and/or receiving communications within a communication service 112. A user that is logged into a communication service 112 but idle may or may not be considered an active user. Exemplary communication protocols for communication services 112 include Internet Relay Chat ("IRC"), OSCAR protocol, Microsoft Notification Protocol (MSNP), Internet Relay Chat (IRC), rendezvous protocol, Yahoo! Messenger Protocol, and Extensible Messaging and Presence Protocol ("XMIPP"). When a user registers to communicate with other users through a particular communication service 112, users acquire a user name and/or other identification information that may be used to identify the user with the communication that it inputs into the communication service 112. A user profile 132 contains some or all identification information associated with a particular user. For example, user profile 132 may include a user name and password for a particular communication service 112. Bridging communication system 100 allows users participating in independent communication services 112 to communicate without changing their respective protocols or client software. In addition, bridging communication system 100 is server based and may be transparent to the individual users of the communication services 12. For any given grouping of communication services 112 to be bridged, system 100 deploys an automated protocol specific agent 144 into each communication service 112.

Administrator interface 102 represents hardware and/or appropriate controlling software for setting up operator interfaces 106 to monitor one or more communication services 112 within system 100. Administrator interface 102 receives instructions 130 regarding particular communication services 112 to be monitored and transmits those instructions 130 to central server 110. In particular embodiments, administrator interface 102 receives instructions 130 regarding particular communication services 112 to be bridged and the preferred bridging mode and transmits those bridging instructions 130 to central server 110 and/or agent server 142. In operation, administrator interface 102 assigns one or more communication services 112 to each one of multiple operator interfaces 106 and sets up the operator interfaces 106 for operators 108 to monitor one or more communication services 112 within system 100. Administrator interface 102 provides a separate window, tab or other graphical container for each communication service 112 that is assigned to a particular operator interface 106.

In some embodiments, operators 108 represent hardware and/or appropriate controlling software. In other embodiments, operators 108 refer to the person or persons attempting to monitor and/or transmit communication using operator interfaces 106 by any method or means. Operators 108 monitor, submit and receive communication within communication services 112 through operator interfaces 106. Operators 108 also enter triggers 128 into operator interfaces 106 to be sent to central server 110. For example, operator 108 may request to be alerted if any user's communication in communication service 112a mentions "Iraq" or request to automatically respond "hello" when a user enters communication service 112b or respond "I am not interested in meeting in person" when a user asks to "meet in person." In addition, operators 108 may input requests into operator interfaces 106 to be sent to central server 110. For example, operator 108 may request the last ten seconds of data from communication service I 12a, the latest alerts 136 from communication service 112a, and/or a list of users currently active within communication service 112a. As another example, operators 108 may request to be hidden from one, some, or all users when monitoring a particular communication service, such as communication service 112a. Although operator 108 is shown as part of operator interface 106, operator 108 may be logically or physically separated from operator interface 106.

Operator interfaces 106 represent hardware and/or appropriate controlling software for displaying data collected from one or more of the communication services 112 within system 100. Operator interfaces 106 are situated to receive from central server 110 and display to operators 108 the data collected and events 134, alerts 136, and geolocation information 138 associated with the data collected. Operator interfaces 106 may display data within any number, type, and/or arrangement of tabs, windows, and other display components using any graphics, display templates, and/or other suitable display software that may be used with a web browser. For example, operator interfaces 106 may run software for mapping geolocation information 138 onto a map for display to operators 108. According to particular embodiments, operator interfaces 106 interact with central server 110 using web-based protocols, such as hypertext transfer protocol (HTTP) or secure HTTP (HTTPS). Operator interfaces 106 are described in more detail below with regard to FIG. 2.

Central server 110 may be any one of a variety of hardware and software components that function to centrally store and process data collected from one or more communication services 112 and to transmit selected stored and processed data to operator interfaces 106 and/or agent servers 142. Central server 110 is situated to receive instructions 130 regarding particular communication services 112 to be monitored from administrator interface 102 and to couple agent servers 142 to operator interfaces 106 to populate the operator interfaces 106 with data from one or more of the communication services 112 for operators 108 to monitor. In particular embodiments, central server 110 receives instructions 130 regarding particular communication services 112 to be bridged and the preferred bridging mode and transmits those bridging instructions 130 to agent server 142. As illustrated, central server 110 includes a control interface 114, an agent interface 11 6, an alert interface 118, a geolocation information interface 120, a database 122, and an event handler 140. While a particular embodiment is illustrated, however, central server 110 may comprise any number and/or type of interface components. For example, central server 110 may include only a single control interface rather than multiple control interfaces. Although only central server 110 and agent servers 142 are illustrated, any number and/or type of servers may be coupled to system 100.

Database 122 may include any number of computer hardware elements or software elements to function as a memory for system 100. Database 122 includes applications 124, operator profiles 126, triggers 128, instructions 130, user profiles 132, events 134, alerts 136, geolocation information 138, and other information as may be necessary according to various implementations of the present example. As illustrated, database 122 may be compartmentalized into different holding places according to particular categories. However, information may be stored in database 122 without regard to categorical distinctions.

Applications 124 are logic encoded in media, such as software and/or programmed logic devices capable of execution when loaded into processing devices, to support monitoring and/or bridging of multiple communication services using multiple protocols. Central server 110 uses applications 124 to monitor multiple communication services using multiple protocols. For example, an application 124 may be an algorithm to search events 124 for keyword triggers 128. Another exemplary application 124 may be an algorithm for mapping event queues and alert queues to the appropriate operator interfaces 106. As another example, an application 124 may be an algorithm for mapping events 134 to the appropriate bridged communication services and associating events 134 with the appropriate user that created the event 134.

An operator profile 126 for a particular operator interface 106 includes the one or more communication services 112 assigned to that operator interface 106. Administrator interface 102 creates an operator profile 126 for a particular operator interface 106 by assigning one or more communication services 112 to that operator interface 106. Operator profiles 126 are used by central server 110 to transmit to operator interfaces 106 only those event queues and alert queues that are associated with the communication services 112 assigned to the operator interfaces 106.

Instructions 130 identify the particular communication services 112 for system 100 to monitor. In particular embodiments, instructions 130 identify particular communication services 112 to be bridged and the preferred bridging mode. Administrator interface 102 receives instructions 130 from a human administrator and/or other entity capable of entering or otherwise communicating instructions 130 to administrator interface, such as, for example, software and/or hardware such as networking equipment and/or servers. Administrator interface 102 transmits instructions 130 to central server 110. Central server 110 receives from administrator interface 102 and transmits instructions 130 to agent server 142, which forwards and may or may not modify and/or reformat all or a portion of instructions 130 to agents 144. In particular embodiments, administrator interface 102 transmits instructions 130 to agent server 142. Agent server 142 may divide instructions 130 into sets of instructions 130 and send a selected set of instructions 130 to each of multiple agents 144, as each agent 144 may monitor only one communication service 112 at a time. In particular embodiments, central server 110 stores instructions 130 in database 122. In particular embodiments, agent server 142 stores instructions 130) in database 122.

A user profile 132 identifies a user with a communication service 112 and may include a user's user name and password for a particular service. When a user registers to communicate with other users through a particular communication service 112, users acquire a user name, password, and/or other identification information that may be used to identify the user with the communication that the user inputs into the communication service 112.

Triggers 128 are instructions to generate alerts 136, instructions to automatically respond to particular communications of one or more users, or any other instructions from operator 108 with regard to monitoring, responding to, processing and/or generating particular occurrences within communication services 112 such as keywords exchanged, communication behaviors of users, or geolocation information. For example, a keyword alert trigger 128 may specify any text mentioning "Iraq." As another example, an automated response trigger 128 may specify an automated response to particular text and/or geolocation information. As an additional example, a geolocation information trigger 128 may specify a test or series of tests for one or more users' locations or for whether any users of one or more communication services 112 match a particular location. As a further example, a manual response trigger is a message that an operator 108 enters into operator interface 106 with respect to a particular communication service 112 for an agent 144 to input into the particular communication service 112 in real-time, real-time, or at a particular time. Operators 108 input triggers 128 into operator interfaces 106 for one or more communication services 112, central server 110 receives triggers 128 from operator interfaces 106 and transmits triggers 128 to agent server 142, and agent server 142 applies triggers 128. According to particular embodiments, central server 110 may apply certain types of triggers 128 instead of or in addition to agent server 142.

An alert 136 is an indication that a trigger 128 has been satisfied. For example, if a trigger 128 specifies any text mentioning "Iraq," an alert 136 associated with that trigger 128 would indicate that a user communicated the text "Iraq" in a communication service 112. Agent server 142 generates alerts 136 by applying triggers 128 to data collected from one or more communication services 112 and transmits alerts 136 to event handler 140 of central server 110. Event handler 140 stores alerts 136 in database 122. Alert interface 118 monitors database 122 for alerts 136, queues alerts 136 for particular communication services 112, and transmits the alert queue for each communication service 112 to the one or more operator interfaces 106 to which the associated communication services 112 were assigned and into which the associated trigger 128 was input. Operator interfaces 106 display alerts 136 to operators 108 using any one or more display methods such as, for example, a pop-up window or tab, flashing a window or tab in which all events 134, including alerts 136, are displayed, and generating an alert sound.

Events 134 represent data collected from communication services 112, such as text messages communicated by users and any other user inputs collected by agents 144 from communication services 112, including automated responses and by other inputs from agents 144. Events 134 include the name of the user responsible for the event 134 and timing information associated with user inputs, such as, for example, the calendar date and time, the total typing time, any information regarding the amount of time it took the user to input all or one or more parts of the input, and/or any information regarding the user's computer activity. Events 134 farther include acknowledgements of users entering and exiting communication services 112, user names of users that are active and/or registered with communication services 112, and user entrances into and exits out of communication services 112. Agent server 142 collects events 134 from agents 144, applies triggers 128 to events 134, and transmits events 134 to event handler 140 of central server 110 for further processing. Event handler 140 associates events 134 received from agent servers 142 with particular agents 144 that collected the events 134 and thus with particular communication services 112 from which events 134 were collected. Event handler 140 of central server 110 stores events 134 in database 122, queues events 134 for particular communication services 112, and transmits the event queue for each communication service 112 to the one or more operator interfaces 106 to which the associated communication services 112 were assigned.

Geolocation information 138 is an identification of a geographic location or other location information of a user of a communication service 112. Agents 144 collect this information about active users of communication services 112, whether the users are connected to the communication service 112 via an Intern-et-connected computer, mobile device, a website or any other connection. Agent server 142 collects geolocation information 138 from agents 144 and transmits geolocation information 138 to geolocation information interface 120 of central server 110 for further processing and delivery to operator interfaces 106. Event handler 140 stores geolocation information 138 in database 122. Geolocation information interface 120 monitors database 122 for geolocation information 138, queues geolocation information 138 for particular communication services 112, and transmits the geolocation information queues for each communication service 112 to the one or more operator interfaces 106 to which the associated communication services 112 were assigned.

In operation, central server 110 receives instructions 130 regarding communication services 112 to be monitored from administrator interface 102 and routes the received instructions 130 to agent server 142 using a web protocol, such as an HTTP protocol. Central server 110 receives triggers 128 and user profiles 132 from operator interface 106 and routes them to agent server 142 using a web protocol, such as an HTTP protocol. Central server 110 receives events 134 from agent servers 142 and generates event queues, alert queues, and geolocation information queues for each one of multiple communication services 112. In particular embodiments, event handler 140 of central server 110 may apply triggers 128 to events 134 and generate corresponding alerts 136. In particular embodiments, central server 110 receives events 134 from agent servers 142 in Extensible Markup Language (XML). In other embodiments, central server 110 receives events 134 from agent servers 142 in HTTP format. Central server 110 determines the one or more communication services 112 assigned to each of multiple operator interfaces 106 according to operator profiles 126 and transmits the event queues, alert queues, and geolocation information queues to the appropriate operator interface 106. Central server 110 also receives triggers 128 and handles requests from operator interface 106 regarding retrieval of particular portions of events 134, alerts 136, and geolocation information 138. In particular embodiments, central server 110 may apply triggers 128 to events 134 that it receives from agent server 142 and generate corresponding alerts 136, or central server 110 may transmit triggers 128 to agent server 142.

Control interface 114 receives operator profiles 126 from administrator interfaces 102, requests from operator interfaces 106 regarding retrieval of particular subsets of events 134, alerts 136, and geolocation information 138, and triggers 128 from operators 108. Control interface 114 maps responses to requests from operator interfaces 106 to appropriate operator interfaces 106 based on requests from operator interfaces 106. Control interface 114 maps responsive event queues, responsive alert queues, and responsive geolocation information queues to appropriate operator interfaces 106 based on operator profiles 126.

Agent interface 116 receives communication services 112 to be monitored and user profiles 132 and dispatches those communication services 112 and user profiles 132 to agents 144 through agent servers 142. Agent interface 116 is operable to load balance multiple agent servers 142 by dispatching those communication services 112 and user profiles 132 to one or more agent servers 142.

Alert interface 118 monitors database 122 for alerts 136. Optionally, alert interface 118 may also generate alerts 136 by monitoring database 122 for triggers 128 and events 134 and applying triggers 128 to events 134. In particular embodiments, alert interface 118 queues alerts 136 in the order in which the events 134 satisfying the triggers 128 occurred or in any other logical arrangement. Alert interface 118 may queue alerts 136 in a separate queue for each trigger 128. According to particular embodiments, based on the control interface 114, alert interface 118 sends alerts 136 to the appropriate window within operator interface 106 for each operator 108. For example, if an operator 108 requests the last ten seconds of alerts 136 from communication service 112a, alert interface 118 will respond to the request by transmitting that portion of its alert queue to operator interface 106.

Geolocation information interface 120 monitors database 122 for geolocation information 138. Geolocation event interface 120 may queue geolocation information 138 in the order in which the associated events occurred or in any other logical arrangement. According to particular embodiments, based on the control interface 114, geolocation information interface 120 sends events to the appropriate window or location within operator interface 106 for each operator 108. For example, if an operator 108 requests the last ten seconds of geolocation information 138 from communication service 112a, geolocation information interface 120 will respond to the request by transmitting that portion of its geolocation information queue to operator interface 106.

Event handler 140 receives events 134 from agent server 142, stores events 134 received into database 122, and communicates events 134 to operator interface 106 for each operator 108. In some embodiments, event handler 140 may parse events into categories such as alert events 136 and geolocation information 138 according to the type of information depicted by a particular event 134. In other embodiments, event handler 140 may store events 134 in database 122 without first separating events 134 into alert events 136 and geolocation informational 138. In particular embodiments, event handler 140 receives events 134 through an HTTP connection. In particular embodiments, event handler 140 may apply one or more triggers 128 to events 134. For example, event handler 140 may search received events 134 for text that matches a keyword-type trigger 128 and generate a corresponding alert 136, and store the alert 136 in database 122. It may be advantageous for both agent server 142 and event handler 140 to be operable to apply the same or different triggers 128 to events 134 in the exemplary instance in which agent server 142 applies one or more triggers 128 as events 134 are received and event handler 140 applies one or more triggers 128 after events 134 have been received and stored in database 122 in response to requests from operators 108 to search prerecorded events 134.

Agent server 142 provides each of multiple agents 144 with the user profile 132 necessary to register the agent 144 with a communication service 112, dispatches one or more agents 144 into one or more communication services 112, and receives events 134 from each of its dispatched agents 144 in the communication protocol in which the events were collected. In particular embodiments, agent server 142 transmits those events 134 to event handler 140 of central server 110. In particular embodiments, agent server 142 associates events 134 received with the agent 144 that collected the events 134, queues events 134 for each agent, and transmits the event queues to event handler 140. In particular embodiments, agent server 142 associates events 134 with the user that created the events 134. In particular embodiments, agent server 142 may send events 134 to event handler 140 in the format in which the events 134 were received, that is, in the format of the communication service 112. Alternatively, agent server 142 translates events 134 into a unified communication protocol used by central server 110. As an example, agent servers 142 may translate received events 134 into an XML-based unified communication protocol for transmission to central server 110. This enables central server 110 to monitor any number and type of communication services 112, with agent servers 142 providing monitoring and translating. Central server 110 may employ any number of agent servers 142 to deploy the needed number of agents 144. For example, if one agent server 142 can deploy a maximum of one hundred agents 144 and central server 110 receives requests for monitoring two hundred communication services 112, then central server 110 may employ at least two agent servers 142 to accommodate the request.

According to particular embodiments, agent server 142 provides a central interconnection point for automatically deploying communication protocol specific automated agents 144 into bridged communication services 112. These automated agents 144 represent users that are not otherwise directly connected to the communication service 112. In particular embodiments, agent server 142 also includes an administrator interface 102 that allows users to enter bridging instructions 130 by selecting particular communication services 112 to be bridged and a preferred bridging mode. Agent server 142 receives bridging instructions 130 from administrator interface 102 and coordinates bridging of events 134 by automated agents 144 in accordance with the bridging instructions 130.

According to particular embodiments, for any given grouping of communication services 112 to be bridged, agent server 142 deploys one or more automated protocol specific agent 144 into each bridged communication service 112. Agent server 142 deploys one or more agents 144 to a given bridged communication service 112 to collect events 134 exchanged within the given bridged communication service 112 and to relay events 134 exchanged within another bridged communication service 112 to the given bridged communication service 112.

In relay mode, agent server 142 deploys a protocol specific monitoring agent 144 into each bridged communication service 112. Monitoring agents 144 collect users' text-based events 134 exchanged in each bridged communication service 112 and transmit all events 134 to the agent server 142. Agent server 142 sends events 134 collected from a source communication service 112 to a destination communication service 112 using relay agents 144.

In transparent mode, agent server 142 deploys a protocol specific agent 144 into each bridged communication service 112. Monitoring agents 144 and relay agents 144 collect names for all active users of the source communication service 112 and transmit the names to agent server 144. Monitoring agents 144 collect users' text-based events 134 exchanged in each bridged communication service 112 and transmit all events 134 to the agent server. Agent server sends events 134 collected from a source communication service 112 to a destination communication service 112 using relay agents 144. For each active user of a source communication service 112 that does not already list the user as an active user, agent server 142 deploys a monitoring agent 144, and, for each active user of the destination communication service 112 that does not already list the user as an active user, agent server 142 deploys a relay agent 144. In particular embodiments, where communications are bridged both to and from a single communication service 112 such that it acts as both a source communication service 112 and a destination communication service 112, one agent is created per active user of the single communication service 112. A user may be considered active if the user is transmitting or receiving communications from the communication service 112. A user that is logged into a communication service 112 but idle may or may not be considered an active user. Agent server 142 maps the communications transmitted by particular users to their user names within the communications services 112 in which they are active or are attempting to become active. Monitoring agents 144 collect users' text-based events 134 exchanged in each bridged communication service 112 and transmit all events 134 to the agent server 142. For each of the events 134 collected, agent server 142 sends the event 134 collected from a source communication service 112 for that event 134 to a destination communication service 112 for that event 134 using a relay agent 144 that is associated with the user inputting the communication. In this way, agent server 142 maps received events 134 to users and their associated relay agents 144. Transparent mode differs from relay mode in that transparent mode utilizes user-specific relay agents 144 (i.e. one automated agent per user) while relay mode utilizes communication service specific relay agents 144 (i.e. one automated agent per communication service).

Agents 144 are assigned by agent servers 142 to monitor, collect, generate and/or relay events 134 within a particular communication service 112. Each of the automated agents 144 receives a user profile 132 from agent server 142, registers with a communication service 112 using the user profile 132, monitors the communication service 112 for events 134, and/or relays events 134 in a native communication protocol of the communication service 112. In particular embodiments, agent 144 may apply triggers 128 to events 134 to generate alerts 136 and geolocation information 138. In particular embodiments, monitoring agents 144 and relay agents 144 support bridging of multiple communication services 112 by operating in either relay mode or transparent mode as described above with respect to agent server 142. In particular embodiments, relay agents 144 may act as an active user proxy for a user creating an event 134 to be relayed that is not already on the list of active users. In particular embodiments, relay agents 144 may translate events 134 to be relayed to a destination communication service 112 into a native communication protocol of the destination communication service 112.

A component described in FIG. 1 may include an interface, logic, memory, and/or other suitable element.

An interface represents hardware and/or appropriate controlling software. An interface receives input, sends output, processes the input and/or output, and/or performs other suitable operations.

Logic represents software and/or programmed logic devices capable of execution when loaded onto processing devices. Processing devices include one or more computers, one or more microprocessors, one or more applications, and/or other logic. When executed, logic performs the operations of a component or manages the operations of a component, such as, for example, generating output from input. A computer-readable medium encoding logic performs and/or manages operations when loaded onto processing devices and executed.

A memory stores information. A memory may comprise one or more tangible, computer-readable, and/or computer-executable storage media. Examples of a memory include computer memory (for example, Random Access Memory (RAM) or Read Only Memory (ROM)), mass storage media (for example, a hard disk), removable storage media (for example, a Compact Disk (CD) or a Digital Video Disk (DVD)), network storage (for example, a server), and/or other computer-readable medium.

The above description provides an example of a system for bridging communications between communication services 112. The example explains particular embodiments and is not all-inclusive. Although system 10 depicts a particular logical configuration of components, system 10 may include any appropriate logical and physical combination, separation, or distribution of the components and their functionality. In addition, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program. As used in this document, "each" refers to every individual member of a set or every individual member of a subset of a set.

Figure 2A:
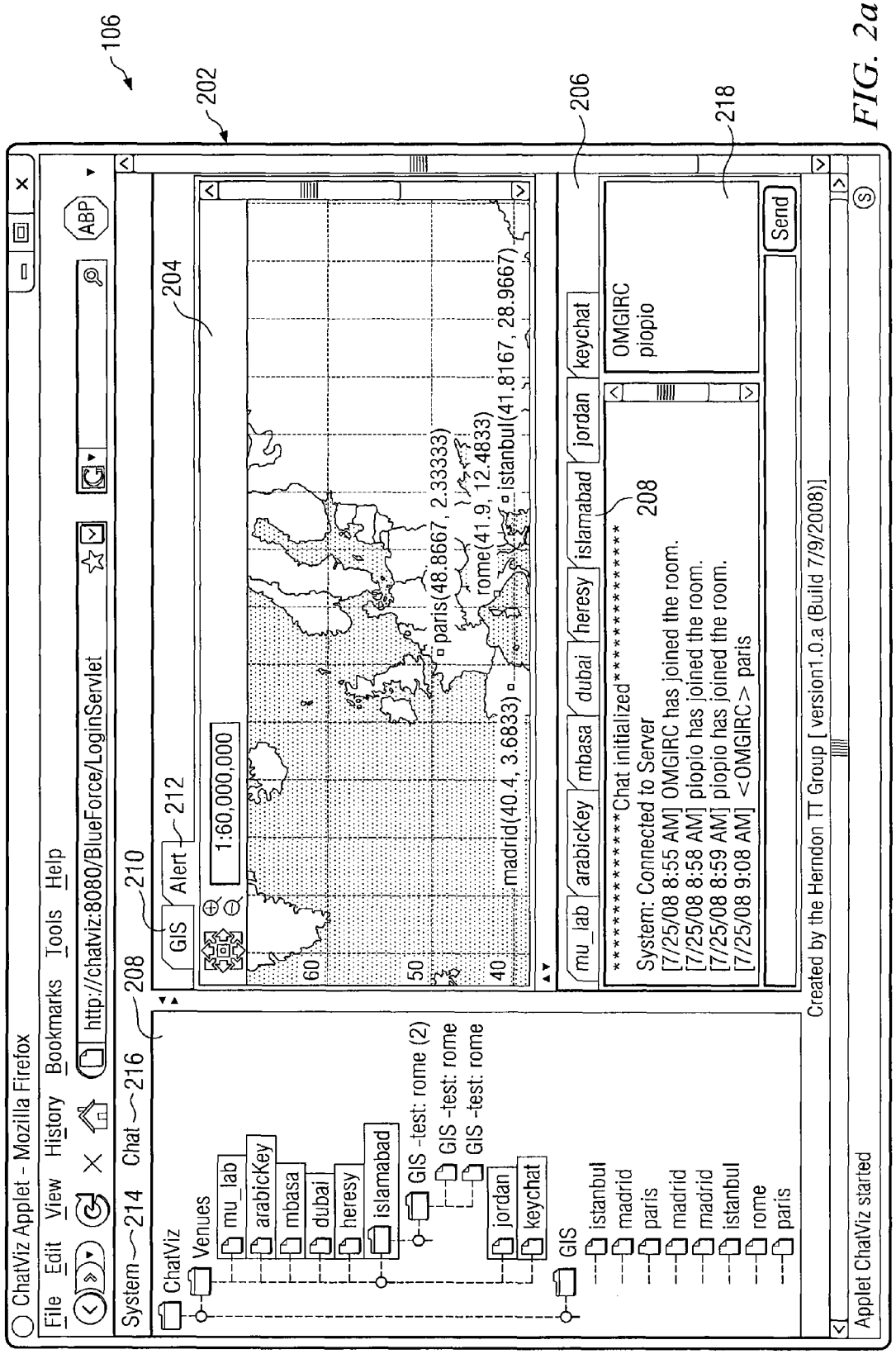
FIGS. 2A and 2B illustrate an example operator interface presenting information collected by the example system of FIG. 1.
Figure 2B:
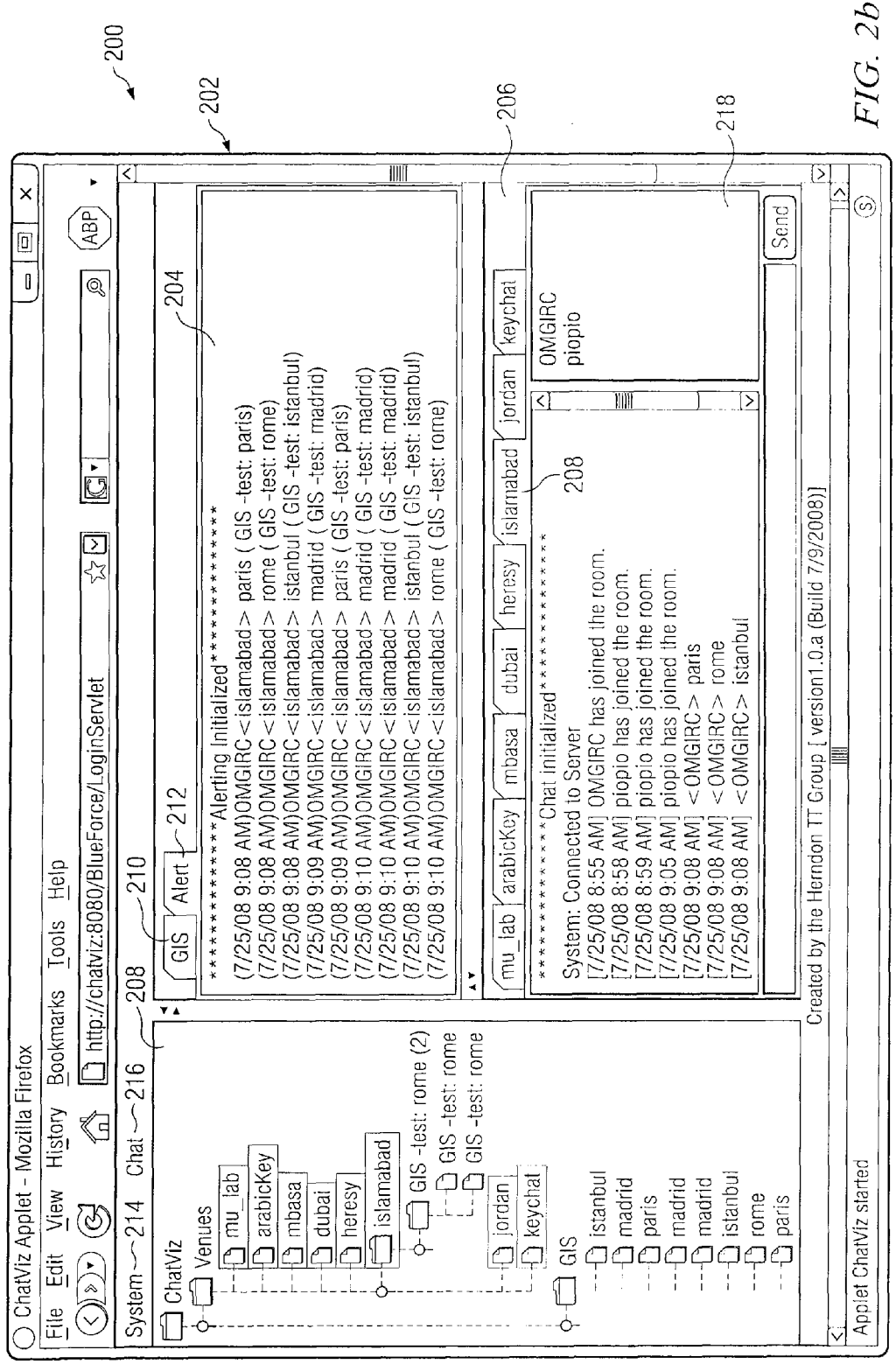
Figure 3:
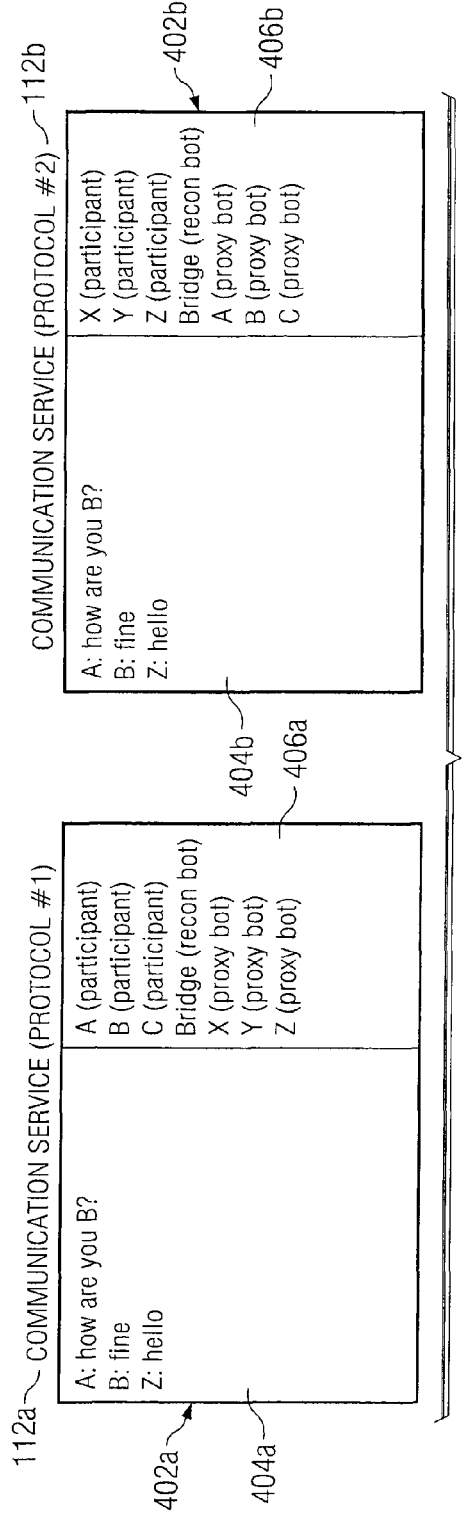
FIG. 3 illustrates example communication services between which communications are bridged in transparent mode by the example system of FIG. 1.
Figure 4:
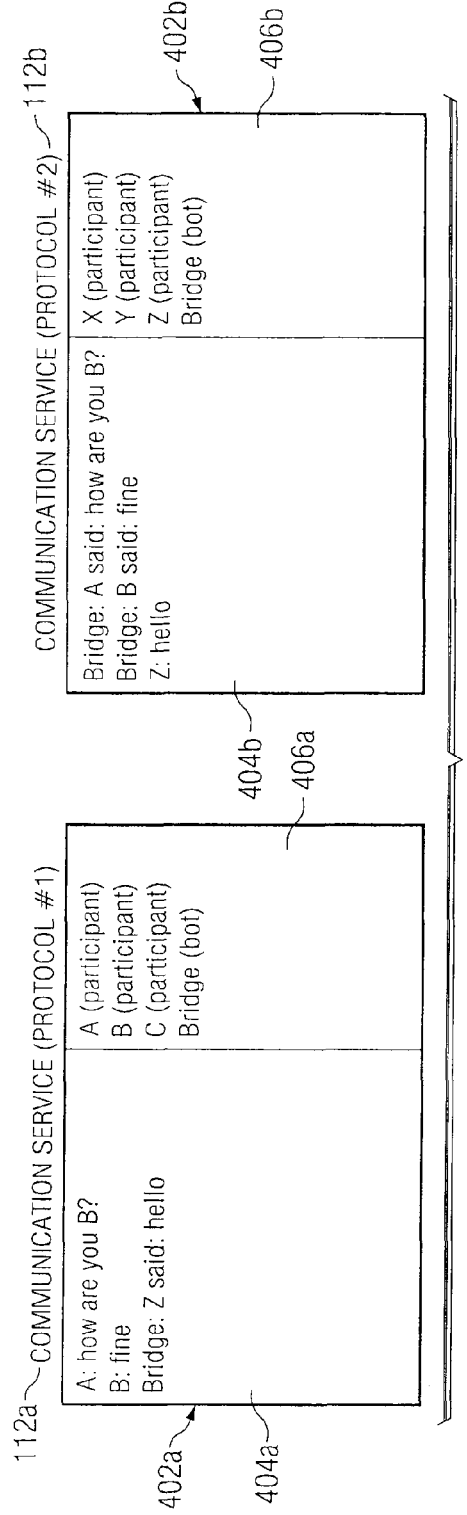
FIG. 4 illustrates example communication services between which communications are bridged in relay mode by the example system of FIG. 1.

FIGS. 2, 3, 4, 5, and 6 illustrate additional details of example embodiments shown in FIG. 1. The description below referring to FIG. 2 describes an example operator interface presenting selected information from the example system 100 of FIG. 1. The description below referring to FIG. 3 illustrates example communication services between which communications are bridged in transparent mode by the example system of FIG. 1. The description below referring to FIG. 4 illustrates example communication services between which communications are bridged in relay mode by the example system of FIG. 1. The description below referring to FIG. 5 describes an example method for monitoring multiple communication services 112 using multiple protocols. The description below referring to FIG. 6 describes an example method for bridging communications between multiple communication services using the example system of FIG. 1.

FIGS. 2A and 2B illustrate an example operator interface, indicated generally at 106, for presenting selected information from the example system 100 of FIG. 1. FIG. 2A illustrates a tabbed view of operator interface 106 in which the geolocation information 138 display tab "GIS" 210 is activated for viewing. FIG. 2B illustrates a tabbed view of operator interface 106 in which the alerts 136 display tab "Alert" 212 is activated for viewing. FIGS. 2A and 2B include browser window 202, upper tab display area 204, lower tab display area 206, and tree directory 208. Operator interface 106 displays those one or more communication services 112 that are assigned by administrator interface 102 to the operator 108 for monitoring, including events 134, alerts 136, and geolocation information 138 from the assigned communication services 112. Operator interface 106 may display events 134, alerts 136, and geolocation information 138 on a real-time or near real-time basis and/or any other events 134, alerts 136, and/or geolocation information 138 that the operator 108 may request and that the operator interface 106 may receive from database 122 of central server 110 through the various components and operations of central server 110 discussed above with respect to FIG. 1.

Browser window 202 generally refers to any suitable display template produced by a browser application to display a web page. As illustrated, browser window 202 displays the web page at which an operator 108 may monitor events 134, alerts 136, and geolocation information 138 for each assigned communication service 112, referred to herein as the "main" page for a particular operator 108. Although not illustrated, operator 108 may scroll up and down within tabs and/or windows to view particular events 134, alerts 136, and geolocation information 138 retrieved by the operator interface 106. Operator 108 may, also request other events 134, alerts 136, and/or geolocation information 138 that have or have not been previously retrieved by the operator interface 106, and browser window 202 may display the results of these requests. According to particular embodiments, browser window 202 displays the web address for the currently displayed one of multiple web pages associated with system 100. Browser window 202 may also display viewing options, system preferences, links to other web pages, and any other displays, options or links, including, but not limited to options associated with system 100 or advertisers of system 100.

As illustrated in browser window 202, "System" 214, if selected, displays a drop down menu that offers the operator 108 multiple viewing options. For example, a "Tab" view, if selected, displays a separate tab for each assigned communication service 112 (as illustrated by FIGS. 2A-2B) and a "Window" view, if selected, displays a separate window for each assigned communication service 112 (not illustrated). To change the view from a tabbed view to a windowed view, operator 108 may select the System 214 drop down menu and choose the "Window" menu item.

As illustrated in browser window 202, "Chat" 216, if selected, displays a drop down menu that offers the operator 108 multiple system preferences. For example, a "Manage Alerts" menu item, if selected, provides a pop-up window in which the operator 108 may create a new alert, edit an existing alert, or delete an alert by pressing the corresponding button. To create a new Alert, operator 108 may select the Chat 216 drop down menu, choose the "Manage Alerts" menu item, and type in, for example, a keyword-type trigger 128 "Iraq" and a trigger name "Keyword search for Iraq."

In the particular embodiment illustrated by browser window 202 of FIGS. 2A and 2B, the main page includes an upper tab display area 204, lower tab display area 206, and tree directory 208. Upper tab display area 204 provides a choice for viewing GIS tab 210 or Alerts tab 212. GIS tab 210 (FIG. 2A) illustrates an example map of geolocation information 138 for the assigned communication services 112. The operator 108 may navigate the map by clicking and dragging the map in desired directions and may zoom in and out to display the map in desired display resolutions. An example alert 136 shown within Alerts tab 212 (FIG. 2B) displays the date, time, user that triggered the alert 136, the assigned communication service 112 where the alert 136 occurred, the trigger 128 associated with the alert 136, and the trigger name for the associated trigger 128. All of this is extremely useful when trying to track when and where an alert 136 occurred.

Lower tab display area 206 displays all events 134, alerts 136, and geolocation information 138 by communication service 112, either one assigned communication service 112 at a time in a tabbed view (as illustrated) or one or more assigned communication services 112 at a time in a windowed view (not illustrated). Lower tab display area 206 displays events 134, alerts 136, and geolocation information 138 in chronological order, including any system generated events 134, such as automated responses. Lower tab display area 206 displays a separate window, tab or other graphical container for each assigned communication service 112. In the particular illustrated embodiment, lower tab display area 206 displays a list of active users 218 that are associated with a particular assigned communication service 112 when the tab or window for that assigned communication service 112 in lower tab display area 206 is highlighted. For example, the list of active users 218 illustrated by FIGS. 2A and 2B lists the active users in the Islamabad communication service 112, and the Islamabad tab 216 is activated. An example event 134 shown within Islamabad tab 208 displays the date, time, user responsible for the event 134, and the event 134. An example occurrence of an alert 136 or geolocation information 138 shown within the Islamabad tab 208 displays the date, time, user responsible for the alert 136 or geolocation information 138, and the trigger 128 or geolocation information 138. All of this is extremely useful for monitoring assigned communication services 112.

Tree directory 208 generally displays a directory of tabs and/or windows that may be shown in upper tab display area 204 and lower tab display area 206. Tree directory 208 includes an expandable entry named "Venues," which includes expandable entries for the assigned communication services 112, expandable entries for the triggers 128 for each assigned communication service 112, and expandable entries for the geolocation information 128 for each assigned communication service 112. Tree directory 208 also includes an expandable entry named "GIS," which includes entries for each of the mapped user locations on the map shown within GIS tab 212.

In addition to the main page displaying events 134, alerts 136, and geolocation information 138 for each communication service 112 (illustrated by FIGS. 2A and 2B), browser window 202 may also display other web pages associated with system 100 and links for operator 108 to switch between the associated web pages. For example, browser window 202 may provide a home page for an operator 108 to login to the main page to monitor the assigned communication services 112. Browser window 202 may also provide links to web pages associated with system 100, such as links to instructions manuals and/or web pages that are not associated with system 100, such as advertising links.

The description of FIGS. 2A and 2B provides an example of an operator interface 106. The example explains particular embodiments and is not all-inclusive. Elements of system 100 may communicate with operator interfaces 106 having any appropriate format, display, contents, and functionalities.

FIGS. 3 and 4 illustrate example bridged communication services 112 between which events 134 are collected and relayed by the example system of FIG. 1 using automated agents 144. FIG. 3 illustrates bridging communication services 112 in transparent mode, and FIG. 4 illustrates bridging communication services 112 in relay mode. A viewing window 402 includes an event display area 404 and a user display area 406. In general, viewing windows 402 illustrate the bridging of events 134 by automated agents 144 between a first communication service 112a using a first communication protocol and a second communication service 112b using a second communication protocol.

Multiple viewing windows 402 may be displayed as separate windows, tabs or other graphical containers for each bridged communication service 112. In the particular illustrated embodiment, one viewing window 402 is assigned to each bridged communication service 112. In particular embodiments, a user views the viewing windows 402 that are generated by the user's standard software for participating in a particular communication service 112 using a particular communication protocol. In some embodiments, displaying multiple viewing windows 402 is useful for monitoring bridged communication services 112 by an administrator.

Event display area 404 displays events 134, alerts 136, and geolocation information 138 in chronological order, including any system generated events 134, such as automated responses. An example event 134 shown within event display area 404 may include the date, time, user responsible for the event 134, and the event 134. In the illustrated embodiment, an example event 134 shown within event display area 404 includes the user responsible for the event 134 and the event 134.

With respect to FIG. 3, exemplary events 134 include "Z: hello" and "A: how are you B?" In transparent mode, events 134 that are relayed between a first communication service 112a and a second communication service 112b appear the same as if they were generated by active users of the communication services 112. In the particular illustrated embodiment, the event 134 "Z: hello" is created by user Z (listed in the user display area 406b as "Z (participant)") in the second communication service 112b, collected and transmitted to agent server 142 by "Bridge (recon bot)," translated by agent server 142 from the second communication protocol to the first communication protocol, sent by agent server 142 to the automated agent 144 "Z (proxy bot)" deployed to the first communication service 112a, and relayed by "Z (proxy bot)" to the first communication service 112a. As another example, the event 134 "B: fine" is created by user B (listed in the user display area 406a as "B (participant)") in the first communication service 112a, collected and transmitted to agent server 142 by "Bridge (recon bot)," translated by agent server 142 from the first communication protocol to the second communication protocol, sent by agent server 142 to the automated agent 144 "B (proxy bot)" deployed to the second communication service 112b, and relayed by "B (proxy bot)" to the second communication service 112b.

With respect to FIG. 4, exemplary events 134 include "Bridge: Z said: hello" and "Bridge: A said: how are you B?" In relay mode, events 134 that are relayed into a communication service 112 do not appear the same as if they were generated by an active user of the communications service 112. In the particular illustrated embodiment, relayed events 134 recite "Bridge" followed by a colon to denote that the event 134 produced after the colon is a relay event 134 produced by a relay agent 144 and not by an active user of the communications service 112. Other words and/or formats may be used to denote that a particular event 134 is a relay event instead of an active user generated event. For example, the event 134 "Bridge: Z said: hello" is created by user Z (listed in the user display area 406b as "Z (participant)") in the second communication service 112b, collected and transmitted to agent server 142 by "Bridge (bot)," translated by agent server 142 from the second communication protocol to the first communication protocol, sent by agent server 142 to the automated agent 144 "Bridge (bot)" deployed to the first communication service 112a, and relayed by "Bridge (bot)" to the first communication service 112a. As another example, the event 134 "B: fine" is created by user B (listed in the user display area 406a as "B (participant)") in the first communication service 112a, collected and transmitted to agent server 142 by "Bridge (bot)," translated by agent server 142 from the first communication protocol to the second communication protocol, sent by agent server 142 to the automated agent 144 "13ridge (bot)" deployed to the second communication service 112b, and relayed by "Bridge (bot)" to the second communication service 112b.

User display area 406 displays a list of active users that are associated with a particular bridged communication service 112. The list of active users may include user names of active users, the communication services 112 to which the users are connected, including any side conversations and/or other communication modes and/or services, communication modes and/or services to which the users are willing to connect, communication protocols in which the user is capable of communicating, and/or any other information associated with the user's name and/or account with the communications service 112 presented in any format and/or separated in any logical manner. In the illustrated embodiment, an example list of active users includes user names of active users and user names of relay agents 144 (i.e. proxy users) separated by a hard return.

With respect to FIG. 3, the list of active users 406a lists all active users of the first communication service 112a using the first communication protocol and relay agents 144 corresponding to all active users of the second communication service 112b using the second communication protocol. In addition, the list of active users 406b lists all active users of the second communication service 112b using the second communication protocol and relay agents 144 corresponding to all active users of the first communication service 112a using the first communication protocol. In the illustrated embodiment, exemplary entries of active users in the user display area 406a include "A (participant)," "Bridge (recon hot)," and "X (proxy bot)." "A (participant)" is an active user of the first communication service 112a. "Bridge (recon bot)" and "X (proxy bot)" are communication protocol-specific automated agents 144 deployed by agent server 142 to the first communication service 112a. "Bridge (recon bot)" automatically collects events 134 exchanged within the first communication service 112a. "Bridge (recon hot)" collects events 134 that are exchanged within the communication service 112 and transmits the collected events 134 to agent server 142 for translation and for relaying to any bridged communication services. "X (proxy hot)" automatically relays events 134 created by user X in a communication service 112 that is bridged to the first communication service 112a and in which user X is an active user, such as the second communication service 112b. "X (proxy hot)" relays events 134 that are created by user "X" in a source communication service 112a that is bridged to target communication service 112b using the communication protocol of the source communication service 112a. "X (proxy bot)" is a proxy for a user "X" that is not otherwise directly connected to the communication service 112 and may or may not appear on the list of active users as if it were directly connected to the communication service 112.

With respect to FIG. 4, the list of active users 406a lists all active users of the first communication service 112a using the first communication protocol and relay agent 144 "Bridge (bot)." In addition, the list of active users 406b lists all active users of the second communication service 112b using the second communication protocol and relay agent 144 "Bridge (bot)." In the illustrated embodiment, exemplary entries of active users in the user display area 406a include "A (participant)" and "Bridge (bot)." "A (participant)" is an active user of the First communication service 112a. "Bridge (bot)" of user display area 406a is a communication protocol-specific automated agent 144 deployed by agent server 142 to the first communication service 112a. "Bridge (bot)" automatically collects events 134 that are exchanged within the first communication service 112a, transmits the collected events 134 to agent server 142 for translation and for relaying to any bridged communication services, and automatically relays events 134 received from agent server 142 to the first communication service 112. In this example, the relayed events 134 correspond to events 134 created by active users of communication services 112 that are bridged to the first communication service 112a, such as the second communication service 112b, and translated to the communication protocol of the first communication service 112a.

Figure 5:
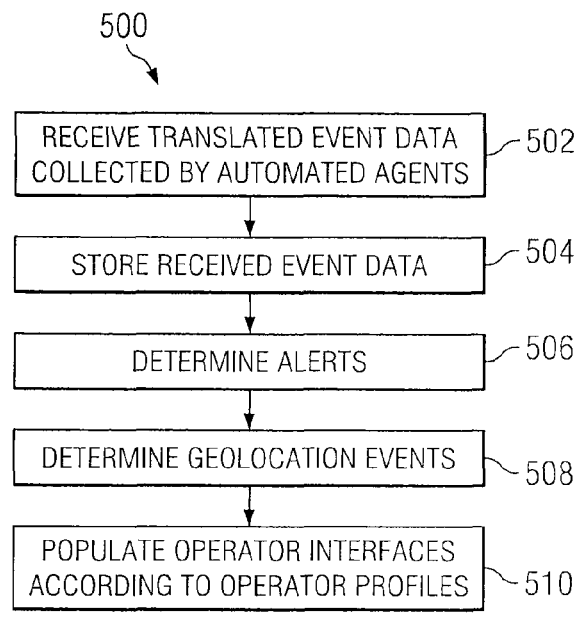
FIG. 5 is a flowchart that illustrates a method for monitoring communications using the example system of FIG. 1.

FIG. 5 is a flowchart illustrating a method, indicated generally at 500, for monitoring multiple communications services using multiple protocols in accordance with various embodiments of the present disclosure. As illustrated, method 500 shows the steps involved for central server 110 to receive translated events 134 from agent server 142 using a unified communication protocol, generate event queues, alert queues, and geolocation information queues for each one of multiple operator interfaces 106, and transmit the appropriate queues to the appropriate locations within the appropriate operator interfaces 106 according to their operator profiles 126.

According to particular embodiments, in step 502, event handler 140 of central server 110 receives events 134 collected by automated agents 144 from agent server 142. In particular embodiments, event handler 140 receives events 134 through an HTTP connection. Step 502 may include associating events 134 receives from agent servers 142 with the particular communications services 112 from which the events were collected by a particular agent 144. In step 504, event handler 140 stores received events 134 in database 122. In particular embodiments, events 134 may be stored categorically as events 134 and/or alerts 136 and/or geolocation information 138. Alternatively, events 134 may be stored without regard for categorical distinctions.

In step 506, alert interface 118 monitors database 122 for events 134 that satisfy triggers 128, generates alerts 136 for events 134 that satisfy triggers 128, and queues alerts 136 in a logical order. Step 506 may include processing events 134 to apply triggers (for example, event handler 140 may search received events 134 for text that matches a keyword-type trigger 128) or otherwise examining and responding to incoming events 134. As another example, event handler 140 may search received events 134 for text and/or geolocation information 138 that matches an instruction to generate an automated response. As a further example, event handler 140 may test geolocation information 138 for one or more users' locations or for whether any users of one or more communications services 112 match a particular location. In step 308, geolocation information interface 120 monitors database 122 for geolocation information 138 and queues geolocation information 138 in a logical order.

In step 510, operator interfaces 106 receive from central server 110 and display to operators 108 data collected from one or more of the communications services and associated events 134, alerts 136, and geolocation information 138. In particular embodiments, central server 110 determines one or more communications services 112 assigned to each operator interface 106 according to operator profiles 126. In particular embodiments, method 500 may include generating alerts 136 based on triggers 128 satisfied by the events and transmitting the generated alerts 136 to the appropriate operator interface 106. In particular embodiments, central server 110 may queue the alerts 136 generated by one or more agent servers 142 and/or by central server 110.

In addition, in step 510, control interface 114 maps the responsive event 134 queues, responsive alert 136 queues, and responsive geolocation information 138 queues to the appropriate operator interfaces 106 based on the operator profiles 126. Control interface 114 ensures that the appropriate events 134 are sent from event handler 140 to the appropriate window or location within operator interface 106 for each operator 108. Control interface 114 ensures that the appropriate alerts 136 are sent from alert interface 118 to the appropriate Window within operator interface 106 for each operator 108. Control interface 114 ensures that the appropriate geolocation information 138 is sent from geolocation information interface 120 to the appropriate window or location within operator interface 106 for each operator 108.

Figure 6:
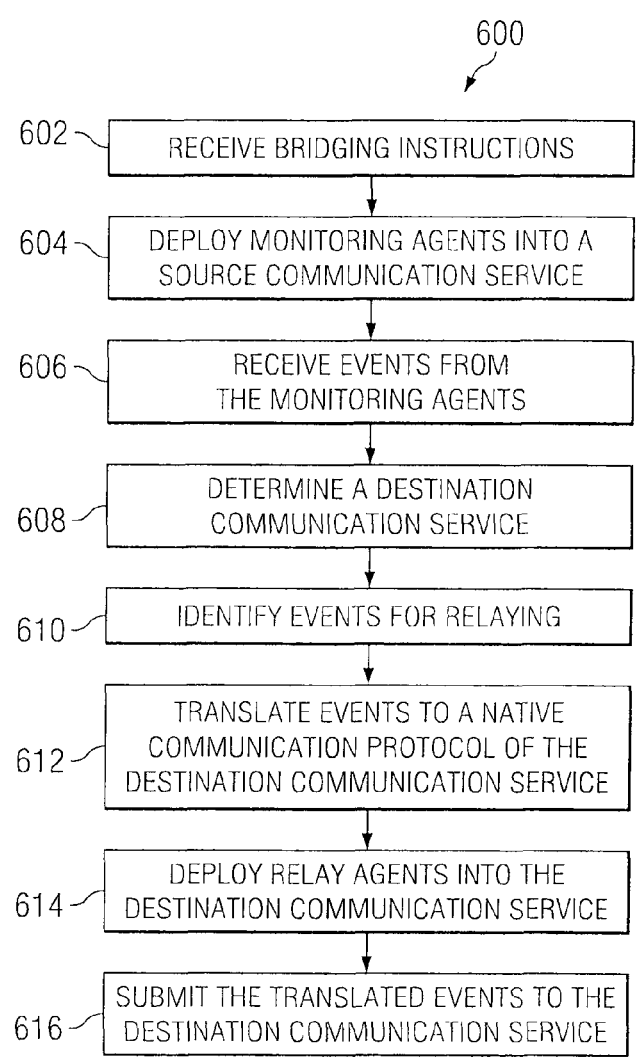
FIG. 6 is a flowchart that illustrates a method for bridging communications between multiple communication services using the example system of FIG. 1.

FIG. 6 is a flowchart illustrating a method, indicated generally at 600, for bridging communications from one communication service to another communication service in accordance with various embodiments of the present disclosure. As illustrated, method 600 shows the steps involved for agent server 142 to receive bridging instructions, deploy monitoring agents into a source communication service 112, to receive events from monitoring agents, to determine a destination communication service, to identify events for relaying, to translate events to a native communication protocol of the destination communication service, to deploy relay agents, and to submit the translated events to the destination communication service.

According to particular embodiments, in step 602, agent server 142 receives bridging instructions 130 from administrator interface 102 regarding particular communication services 112 to be bridged and a preferred bridging mode. In step 604, agent server 142 deploys a protocol specific automated monitoring agent 144 into each source communication service 112 bridged to a particular destination communication service 112. Monitoring agents 144 collect text-based events 134 exchanged in each bridged communication service 112 and transmit the collected events 134 to the agent server. A particular monitoring agent 144 may collect all or some of the events 134 exchanged in a bridged communication service 112, such as, for example, all events 134 created a particular user, all events 134 created by all users, and/or any portion of events 134, alerts 136, and/or geolocation information 138 exchanged within the bridged communication service 112. In particular embodiments, monitoring agents 144 collect names for all active users of the source communication service 112 and transmit the names to agent server 144. In step 606, agent server 142 receives the collected events 134 from monitoring agents 144. In step 608, agent server 142 determines a destination communication service 112 to which to send collected events 134, and, in step 610, agent server 142 identifies particular events 134 to relay to any and/or all particular destination communication services 112 using relay agents 144 according to the bridging instructions 130. In step 612, agent server 142 translates events 134 to a native communication protocol of the destination communication service. In particular embodiments, the translation step 612 is performed at least in part by relay agents 144.

In addition, in step 614, agent server 142 deploys relay agents 142 to any and/or all destination communication services 112 bridged to the source communication service 112. In relay mode, agent server 142 deploys one automated relay agent 144 to each destination communication service 112. In particular embodiments, the one automated relay agent 144 may be the same agent 144 as the monitoring agent 144 associated with the same communication service 112. In transparent mode, agent server 142 deploys an automated relay agent 144 for each bridged user of a destination communication service 112. To identify particular events to submit to a particular relay agent 144 associated with a particular user agent server 142 maps the events 134 created by the user to their user names. Further, in step 616, agent server 142 submits the translated events 134 to the bridged communication services 112 using one or more relay agents 144. In particular embodiments, agent server 142 submits the translated events 134 to one or more relay agents 144, which submit the translated events 134 to the second bridged communication service 112b.

The methods described with respect to FIGS. 5 and 6 are merely illustrative. The manner of operation and devices indicated as performing the operations may be modified in any appropriate manner. While the method describes particular steps performed in a specific order, system 100 contemplates any suitable collection and arrangement of elements performing some, all, or none of these steps in any operable order.

Particular examples specified throughout this document are intended for example purposes only and are not intended to limit the scope of the present disclosure. In particular, the illustrations in the FIGURES are not necessarily drawn to scale.

What is claimed is:

1. A system for bridging communications, comprising: a database comprising a plurality of user profiles; and agent servers, each of the agent servers adapted to deploy monitoring agents, each of the monitoring agents adapted to receive an identification of a source communication service and a first selected one of the user profiles, to register the first selected user profile with the source communication service, to collect events from the source communication service in a native communication protocol of the source communication service, and to transmit the events to the agent server, wherein the source communication service comprises a real-time group communication service; wherein the agent servers are further adapted to receive the events and, for sets of bridging instructions, to determine a destination communication service according to the sets bridging instructions, to identify events from the received events for relaying to the destination communication service, and to translate the identified events to a native communication protocol of the destination communication service; and wherein the agent servers are further adapted to deploy relay agents, each of the relay agents adapted to receive an identification of a destination communication service, a second selected one of the user profiles, and at least a portion of each of selected ones of the translated events, to register the second selected user profile with the destination communication service, and to submit the translated events to the destination communication service, wherein a communication portion of each of the relayed events comprises a user name that corresponds to a user that originated the event, an original communication, and an indication that the user originated the communication portion, the indication comprising language for indicating that the user originated the communication and one or more spaces, characters, or textual symbols for separating the user name and the indication from the communication.

2. The system of claim 1, wherein the agent servers are further operable, in relay mode, to: deploy an automated agent of a plurality of automated agents to each of two or more bridging communication services, each of the plurality of automated agents operable to: receive an identification of a bridging communication service and a third selected one of the user profiles; register the third selected user profile with the bridging communication service; collect a plurality of events from the bridging communication service in a native communication protocol of the bridging communication service; transmit the events to the agent server; receive the translated events; and for each of the translated events, identify a user name portion of the translated event and a communication portion of the translated event, generate a textual communication comprising the user name portion, the communication portion, and an indication that the communication portion is associated with the user name portion, and submit the textual communication to the bridging communication service.

3. The system of claim 2, wherein the indication that the communication portion is associated with the user name portion comprises one or more spaces, characters, or textual symbols for separating the user name portion from the communication portion.

4. The system of claim 1, wherein the agent servers are further operable, in transparent mode, to: deploy one monitoring agent to the source communication service; for each of a plurality of users associated with the source communication service: deploy one relay agent to the destination communication service; identify a selection of the translated events that were originated by the user, each of the translated events comprising a user name portion and a communication portion; and transmit the communication portions of the selected translated events to the relay agent.

5. The system of claim 1, wherein the agent servers are further operable to: for each of the translated events, determine a timing characteristic for the collected event by identifying a first origination time for the collected event, identifying a second origination time for the immediately preceding collected event, calculating a difference between the second origination time and the first origination time, and designating the difference as the timing characteristic; and submit each of the translated events to the destination communication service according to the timing characteristic associated with the translated event.

6. The system of claim 1, further comprising an administrator interface operable to transmit bridging instructions to each of one or more agent servers, the bridging instructions comprising two or more communication services to be bridged and a mode of bridging that is selected from a group consisting of a transparent mode and a relay mode.

7. A method for bridging communications, comprising:
maintaining in a database user profiles; receiving a profiles and sets of monitoring instructions from a central server; deploying monitoring agents, each of the monitoring agents adapted to receive an identification of a source communication service and a first selected one of the user profiles, to register the first selected user profile with the source communication service, to collect events from the source communication service in a native communication protocol of the source communication service, and to transmit the events to the agent server, wherein the source communication service comprises a real-time group communication service; receiving the events; and for each of sets of bridging instructions, determining a destination communication service according to the bridging instructions, identifying events from the received events to relay to the destination communication service, and translating the identified events to a native communication protocol of the destination communication service; and deploying relay agents, each of the relay agents adapted to receive an identification of a destination communication service, a second selected one of the user profiles, and at least a portion of each of selected ones of the translated events, to register the second selected user profile with the destination communication service, and to submit the translated events to the destination communication service, for each of the translated events, determining a timing characteristic for the collected event by: identifying a first origination time for the collected event; identifying a second origination time for the immediately preceding collected event; calculating a difference between the second origination time and the first origination time; and designating the difference as the timing characteristic; and submitting each of the translated events to the destination communication service according to the timing characteristic associated with the translated event.

8. The method of claim 7, further comprising, in relay mode: deploying an automated agent of a plurality of automated agents to each of two or more bridging communication services, each of the plurality of automated agents operable to: receive an identification of a bridging communication service and a third selected one of the user profiles; register the third selected user profile with the bridging communication service; collect a plurality of events from the bridging communication service in a native communication protocol of the bridging communication service; transmit the events to the agent server; receive the translated events; and for each of the translated events, identify a user name portion of the translated event and a communication portion of the translated event, generate a textual communication comprising the user name portion, the communication portion, and an indication that the communication portion is associated with the user name portion, and submit the textual communication to the bridging communication service.

9. The method of claim 8, wherein the indication that the communication portion is associated with the user name portion comprises one or more spaces, characters, or textual symbols for separating the user name portion from the communication portion.

10. The method of claim 7, further comprising, in transparent mode: deploying one monitoring agent to the source communication service; and for each of user of a plurality of users associated with the source communication service: deploying one relay agent to the destination communication service; identifying a selection of the translated events that were originated by the user, each of the translated events comprising a user name portion and a communication portion; and transmitting the communication portions of the selected translated events to the relay agent.

11. The method of claim 7, wherein the communication portion of each of the relayed events comprises a user name that corresponds to a user that originated the event, an original communication, and an indication that the user originated the communication portion, the indication comprising language for indicating that the user originated the communication and one or more spaces, characters, or textual symbols for separating the user name and the indication from the communication.

12. The method of claim 7, further comprising:
transmitting, by an administrator interface, bridging instructions to each of one or more agent servers, the bridging instructions comprising two or more communication services to be bridged and a mode of bridging that is selected from a group consisting of a transparent mode and a relay mode.

13. A non-transitory computer readable medium comprising software for bridging communications, the software comprising computer code such that when executed is operable to: maintain in a database user profiles; receive user profiles and sets of monitoring instructions from a central server; deploy monitoring agents, each of the monitoring agents adapted to receive an identification of a source communication service and a first selected one of the user profiles, to register the first selected user profile with the source communication service, to collect events from the source communication service in a native communication protocol of the source communication service, and to transmit the events to the agent server, wherein the source communication service comprises a real-time group communication service; receive the events; and for each of sets of bridging instructions, determine a destination communication service according to the bridging instructions, identify events from the received events to relay to the destination communication service, and translate the identified events to a native communication protocol of the destination communication service; and deploy relay agents, each of the relay agents adapted to receive an identification of a destination communication service, a second selected one of the user profiles, and at least a portion of each of selected ones of the translated events, to register the second selected user profile with the destination communication service, and to submit the translated events to the destination communication service, for each of the translated events, determine a timing characteristic for the collected event by identifying a first origination time for the collected event, identifying a second origination time for the immediately preceding collected event, calculating a difference between the second origination time and the first origination time, and designating the difference as the timing characteristic; and submit each of the translated events to the destination communication service according to the timing characteristic associated with the translated event.

14. The computer readable storage medium of claim 13, the computes code further operable when executed, in relay mode, to: deploy an automated agents to each of two or more bridging communication services, each of the automated agent operable to: receive an identification of a bridging communication service and a third selected one of the user profiles; register the third selected user profile with the bridging communication service; collect a plurality of events from the bridging communication service in a native communication protocol of the bridging communication service; transmit the events to the agent server; receive the translated events; and for each of the translated events, identify a user name portion of the translated event and a communication portion of the translated event, generate a textual communication comprising the user name portion, the communication portion, and an indication that the communication portion is associated with the user name portion, and submit the textual communication to the bridging communication service.

15. The computer readable storage medium of claim 14, wherein the indication that the communication portion is associated with the user name portion comprises one or more spaces, characters, or textual symbols for separating the user name portion from the communication portion.

16. The computer readable storage medium of claim 13, the computer code further operable when executed, in transparent mode, to: deploy one monitoring agent to the source communication service; for each of a plurality of users associated with the source communication service: deploy one relay agent to the destination communication service, identify a selection of the translated events that were originated by the user, each of the translated events comprising a user name portion and a communication portion; and transmit the communication portions of the selected translated events to the relay agent.

17. The computer readable storage medium of claim 13, wherein the communication portion of each of the relayed events comprises a user name that corresponds to a user that originated the event, an original communication, and an indication that the user originated the communication portion, the indication comprising language for indicating that the user originated the communication and one or more spaces, characters, or textual symbols for separating the user name and the indication from the communication.

* * * * *